(12) United States Patent
Gauthier et al.

(10) Patent No.: US 8,133,618 B2
(45) Date of Patent: Mar. 13, 2012

(54) PROCESS FOR PREPARING ELECTROACTIVE INSERTION COMPOUNDS AND ELECTRODE MATERIALS OBTAINED THEREFROM

(75) Inventors: Laurent Gauthier, Montréal (CA);
Michel Gauthier, La Prairie (CA);
Donald Lavoie, Montréal (CA);
Christophe Michot, Montréal (CA);
Nathalie Ravet, Montréal (CA)

(73) Assignees: Universite de Montreal, Montreal (CA);
Centre National de la Recherche Scientifique, Paris (FR); Phostech Lithium Inc., Montreal (CA)

( * ) Notice: Subject to any disclaimer, the term of this patent is extended or adjusted under 35 U.S.C. 154(b) by 83 days.

(21) Appl. No.: 12/418,176

(22) Filed: Apr. 3, 2009

(65) Prior Publication Data

US 2009/0189114 A1 Jul. 30, 2009

Related U.S. Application Data (63) Continuation of application No. 10/536,431, filed as application No. PCT/CA2004/002182 on Dec. 22, 2004, now Pat. No. 7,534,408.

(60) Provisional application No. 60/531,606, filed on Dec. 23, 2003.

(51) Int. Cl.
*H01M 4/136* (2010.01)
*C01B 25/45* (2006.01)
*C01B 33/00* (2006.01)

(52) U.S. Cl. .................. 429/231.95; 429/221; 429/223; 429/224; 423/306; 423/332

(58) Field of Classification Search ............. 429/231.95, 429/221, 223, 224, 231.5; 423/306, 332
See application file for complete search history.

(56) References Cited

U.S. PATENT DOCUMENTS

| 5,750,824 | A | 5/1998 | Day |
| 5,810,382 | A | 9/1998 | Onishi |
| 5,910,382 | A | 6/1999 | Goodenough et al. |
| 6,203,946 | B1 | 3/2001 | Barker et al. |
| 6,387,568 | B1 * | 5/2002 | Barker et al. ............. 429/218.1 |
| 6,391,493 | B1 | 5/2002 | Goodenough et al. |

(Continued)

FOREIGN PATENT DOCUMENTS

CA 2307119 4/2000

(Continued)

OTHER PUBLICATIONS

A.K. Padhi et al., "Phospho-olivines as Positive-Electrode Materials for Rechargeable Lithium Batteries," J. Electrochem. Soc., Apr. 1997, pp. 1188-1194. vol. 144, No. 4.

(Continued)

*Primary Examiner* — Stephen J. Kalafut
(74) *Attorney, Agent, or Firm* — Buchanan Ingersoll & Rooney P.C.

(57) ABSTRACT

A process for preparing an at least partially lithiated transition metal oxyanion-based lithium-ion reversible electrode material, which includes providing a precursor of said lithium-ion reversible electrode material, heating said precursor, melting same at a temperature sufficient to produce a melt including an oxyanion containing liquid phase, cooling said melt under conditions to induce solidification thereof and obtain a solid electrode that is capable of reversible lithium ion deinsertion/insertion cycles for use in a lithium battery. Also, lithiated or partially lithiated oxyanion-based-lithium-ion reversible electrode materials obtained by the aforesaid process.

25 Claims, 7 Drawing Sheets

U.S. PATENT DOCUMENTS

| | | | |
|---|---|---|---|
| 6,514,640 B1 | 2/2003 | Armand et al. | |
| 6,528,033 B1 | 3/2003 | Barker et al. | |
| 6,645,452 B1 | 11/2003 | Barker et al. | |
| 6,777,132 B2 * | 8/2004 | Barker et al. | 429/231.1 |
| 7,348,100 B2 * | 3/2008 | Adamson et al. | 429/218.1 |
| 7,534,408 B2 * | 5/2009 | Gauthier et al. | 423/306 |
| 7,601,318 B2 * | 10/2009 | Armand et al. | 423/306 |
| 2003/0064290 A1 | 4/2003 | Li | |
| 2003/0215715 A1 | 11/2003 | Barker et al. | |
| 2004/0033360 A1 | 2/2004 | Armand et al. | |
| 2004/0086445 A1 | 5/2004 | Armand et al. | |
| 2006/0127767 A1 | 6/2006 | Gauthier et al. | |
| 2006/0194113 A1 | 8/2006 | Okada et al. | |
| 2009/0208843 A1 | 8/2009 | Partington | |

FOREIGN PATENT DOCUMENTS

| | | |
|---|---|---|
| CA | 2395115 C | 7/2004 |
| EP | 0 931 361 B1 | 12/2001 |
| EP | 1 193 784 A2 | 4/2002 |
| EP | 1 339 119 A1 | 8/2003 |
| JP | 2005-158673 | 6/2005 |
| WO | 98/12761 | 3/1998 |
| WO | 00/60679 | 10/2000 |
| WO | 00/60680 | 10/2000 |
| WO | 01/54212 A1 | 7/2001 |
| WO | 02/27823 A1 | 4/2002 |
| WO | 02/27824 A1 | 4/2002 |
| WO | 03/069701 A1 | 8/2003 |
| WO | 2006/057146 A2 | 6/2006 |
| WO | WO 2007/093856 A1 | 8/2007 |

OTHER PUBLICATIONS

Sung-Yoon Chung et al., "Microscale Measurements of the Electrical Conductivity of Doped $LiFePO_4$," Electrochemical and Solid-State Letters, 2003, pp. A278-A282. vol. 6, No. 12.

Toshio Yokokawa et al., "Ferric-ferrous ratio in $Na_2O$-$P_2O_5$ melts," Physics and Chemistry of Glasses, Oct. 1974, pp. 113-115. vol. 15, No. 5.

S. Apinitis et al., "Synthesis and x-ray diffraction study of the lithium cobalt double orthophosphate LiCoPO4," 1990, pp. 283-284, vol. 3, Latvijas PSR Zinatnu Akademijas Vestis, Kimijas Serija, USSR (in Russian).

A.B. Bykov et al., "Synthesis and growth of superionic conductor crystals $Li_3M_2(PO_4)_3$ ($M=Fe^{3+}$, $Cr^{3+}$, $Sc^{3+}$)," 1987, pp. 1515-1519, vol. 32, No. 6, A.P. Inst. Kristallog.; USSR (in Russian).

Supplemental European Search Report mailed Nov. 25, 2010 in corresponding European Application 04 80 2357 (3 pages).

Non-Final Office Action issued in U.S. Appl. No. 12/827,565 on May 11, 2011 (11 pages).

Yang et al., "Preparation of LiFePO4 Powders by co-Precipitation," *Journal of Power Sources*, 146 (2005) pp. 539-543, Elsevier B.V.

* cited by examiner

PROCESS FOR PREPARING ELECTROACTIVE INSERTION COMPOUNDS AND ELECTRODE MATERIALS OBTAINED THEREFROM

RELATED APPLICATIONS

The present application claims priority to U.S. Application No. 10/536,431, filed on Nov. 16, 2005, now U.S. Pat. No. 7,534,408, which claims priority to U.S. Provisional Application No. 60/531,606, filed Dec. 23, 2003, and International Application No. PCT/CA2004/002182, filed Dec. 22, 2004. The contents of U.S. Application No. 10/536,431, U.S. Provisional Application No. 60/531,606, and International Application No. PCT/CA2004/002182 are incorporated herein by reference.

TECHNICAL FIELD

The invention relates to a process for preparing transition metal phosphate based electroactive compounds for battery application and to materials made by said process, such as $LiFePO_4$ and non-stoichiometric or doped $LiFePO_4$ and other analog phosphates for use in lithium batteries.

BACKGROUND ART

Transition Metal Phosphate-Based Electrode Materials for Lithium Batteries and their Synthesis Since Goodenough pointed out the value of lithium ion reversible iron phosphate-based electrodes for use in lithium and lithium-ion batteries (J. Electrochemical Society, vol. 144, No. 4, pp. 1188-1194 and U.S. Pat. Nos. 5,810,382; 6,391,493 B1 and 6,514,640 B1) several groups have developed synthesis processes for making lithiated iron phosphates of the ordered-olivine, modified olivine or rhombohedral nasicon structures and other chemical analogs containing transition metals other that iron.

Until now most processes and materials described in the art to manufacture electrochemically active phosphate-based electrodes for use in battery applications are based on solid state reactions obtained with $iron^{+2}$ precursors intimately mixed with lithium and phosphate containing chemicals that are used individually or as a combination thereof. $Iron^{+2}$ oxalate and acetate are the more frequently used starting materials for syntheses carried out under an inert or partially reducing atmosphere to avoid transition metal oxidation to a higher level, e.g. $Fe^{+3}$ for example (see Sony PCT WO 00/60680A1 and Sony PCT WO 00/60679 A1). $LiFePO_4$ active cathode materials with improved electrochemical performance were also obtained using C introduced as an organic precursor during material synthesis (Canadian Application No. 2,307,119, laid-open date Oct. 30, 2000). Addition of carbon powder or C-coating to $LiFePO_4$ increases powder electronic conductivity, normally in the range of 10-9-10-10 $Scm^{-1}$ for pure $LiFePO_4$ at ambient temperature. More recently, solid-state syntheses of $LiFePO_4$ obtained from $Fe^{+3}$ precursors such as $Fe_2O_3$ or $FePO_4$ have been described. These syntheses use reducing gases or precursors (PTC/CA2001/001350 published as WO 02/27824 and PTC/CA2001/001349 published as WO 02/27823) or are carried out by direct reduction (so-called carbothermic reduction) of mixed raw chemicals with dispersed C powder (Valence PCT WO 01/54212 A1).

All of these solid-state synthesis reaction ways require relatively long reaction time (several hours) and intimate mechanical dispersion of reactants since the synthesis and/or particle growth in the solid state are characterized by relatively slow diffusion coefficients. Furthermore, particle size, growth, and particle size distribution of the final electrode material are somewhat difficult to control from chemical precursors particle dimensions or in view of the reactive-sintering process, partially suppressed by the presence of dispersed or coated carbon on reacting materials.

Recent attempts to grow pure or doped $LiFePO_4$ in solid state and at high temperature, for example 850° C., have led to iron phosphate with 20 micron single grain sized, intimately mixed with iron phosphide impurities and with elemental C thus making intrinsic conductivity evaluation difficult (Electrochemical and Solid-State Letters, 6,(12), A278-A282, 2003).

None of the previously demonstrated synthesis procedures to make $LiFePO_4$, doped or partially substituted LiFePO4 and transition metal phosphate-based analogs as electrode materials, contemplate a direct molten state phase process in which a liquid, phosphate-containing phase is used to achieve synthesis, doping or simply to melt and prepare electrochemically active lithiated or partially lithiated transition metal phosphate-based electrode materials, especially phosphate-based materials made of iron, manganese or their mixtures obtained in a dense form as a result of a melting/cooling process, optionally comprising one or more synthesis, doping or partial substitution steps.

In fact most known synthesis work on phosphates for use as electrode material suggest working at low temperature to avoid rapid particle growth in the solid state and partial decomposition of the iron phosphate under reducing conditions as such or irreversible decomposition of the precursor chemical at too high a temperature.

Metal Phosphates Preparation by Melting Process

Although inorganic phosphates, pyrophosphates or phosphorous pentoxide have been used with iron oxide and other oxides, to melt and stabilize by vitrification, hazardous metal wastes such as alkali and alkaline earth radioactive elements (U.S. Pat. No. 5,750,824) the chemical formulation of the melt obtained at a temperature in the range of 1100-1200° C., is variable with both $Fe^{+2}$ and $Fe^{+3}$ being present. The purpose was indeed to obtain a stable vitreous composition and not a specific formulation and structure that are appropriate for electrochemical activity, i.e. capable of high reversible lithium-ion insertion-desinsertion.

Additional literature on ferric-ferrous or $Mn^{+2}$—$Mn^{+3}$ ratios observed in sodium oxide-phosphorus pentoxide melts at lower temperature, for example 800° C., is also found in Physics and Chemistry of Glasses (1974), 15(5), 113-5. (*Ferric-ferrous ratio in sodium oxide-phosphorus pentoxide melts*. Yokokawa, Toshio; Tamura, Seiichi; Sato, Seichi; Niwa, Kichizo. Dep. Chem., Hokkaido Univ., Sapporo, Japan. Physics and Chemistry of Glasses (1974), 15(5), 113-15.)

A Russian publication describes the growth of $LiCoPO_4$ crystals in air from LiCl—KCl-based melts containing lithium pyrophosphate in order to make X-ray diffraction studies, but no mention or suggestion is made as to the use of melts in a process to prepare electrochemically active lithium-ion inserting phosphate cathodes containing air sensitive iron for use in lithium-ion batteries. *Synthesis and x-ray diffraction study of the lithium cobalt double orthophosphate LiCoPO4*. Apinitis, S.; Sedmalis, U. Rizh. Tekhnol. Univ., Riga, USSR. Latvijas PSR Zinatnu Akademijas Vestis, Kimijas Serija (1990), (3), 283-4.

Another work by Russian authors describes crystal growth from melt of $M^{+3}$ (including isovalent and heterovalent cations) phosphates for use as superionic conductors including ferric phosphate of the formula $Li_3Fe_2(PO_4)_3$. Nowhere it is shown or even suggested that such material can be electrochemically active as an electrode material, furthermore, their formulations including isovalent metals are not adapted for such use. Furthermore, these phosphate containing materials are fully oxidized and of no use in a lithium-ion battery normally assembled in discharged state (with the transition metal in its lower oxidation state and the reversible lithium-ions present in the electrode after material synthesis). *Synthesis and growth of superionic conductor crystals $Li_3M_2(PO_4)_3$ ($M=Fe^{3+}, Cr^{3+}, Sc^{3+}$)*. Bykov, A. B.; Demyanets, L. N.; Doronin, S, N.; Ivanov-Shits, A. K.; Mel'nikov, O. K.; Timofeeva, V. A.; Sevast'yanov, B. K.; Chirkin, A. P. Inst. Kristallogr., USSR. Kristallografiya (1987), 32(6), 1515-19.

None of the previous art teaches how to make a lithiated phosphate electrode using a simple and rapid process in which phosphate cathode formulations are prepared in the molten state and cooled in order to obtain a solid cathode material having electrochemical properties that are optimized for use in lithium batteries, especially lithium-ion batteries (synthesis in the discharged or partially discharged state). In fact, previous art on phosphate-based cathode materials suggests that as low a temperature as possible (450-750° C.) is better to achieve good electrochemically active formulation and stoichiometry, for example: $LiFePO_4$ formulation with adequate particle size and optimal electrochemical activity, while avoiding total iron reduction to Fe° or simple thermal decomposition of the iron or other metal phosphate to oxide and $P_2O_5$ or to iron phosphides at temperature higher than 850-950° C. In fact, the melting of pure lithiated phosphates, not to say electrochemically active ones, without partial or total decomposition was not expected or described; neither, a fortiori, a process combining chemical synthesis and phosphate cathode formulation melt.

DISCLOSURE OF THE INVENTION

New Process for Making Pure, Partially Substituted or Doped Lithiated Transition Metal Phosphate Cathodes The present invention relates to a new process based on the use of a molten phase, preferably a molten phosphate-containing liquid phase, to obtain lithiated or partially lithiated transition metal oxyanion-based, such as phosphate-based, electrode materials. The process comprises the steps of providing a precursor of the lithium-ion reversible electrode material, heating the electrode material precursor, melting it at a temperature sufficient to produce a melt comprising an oxyanion, such as phosphate, containing liquid phase, and cooling the melt under conditions to induce solidification thereof, and obtain a solid electrode material that is capable of reversible lithium ion deinsertion/insertion cycles for use in a lithium battery. Any one of these steps may be carried out under a non reactive or partially reducing atmosphere. According to a preferred embodiment, the process may include chemically reacting the precursor when heating and/or melting same.

As used in the present description and claims, the term precursor means an already synthesized at least partially lithiated transition metal oxyanion, preferably phosphate, electrode material or naturally occurring lithiated transition metal oxyanion, preferably phosphate minerals, such as triphylite, having the desired nominal formulation or, a mixture of chemical reactants containing all chemical elements required for making, when reacted, an at least partially lithiated transition metal oxyanion, such as phosphate-based, electrode material of the right formulation. The mixture may contain other metal and non-metal element additives or reductant chemicals such as C or other carbonaceous chemicals or metallic iron, or mixtures thereof.

According to a preferred embodiment of the invention, the temperature at which the molten phosphate containing phase is obtained, is between the melting point of the lithiated transition metal phosphate material and 300° C. above, more preferably less that 150° C. above that temperature, in order to limit thermal decomposition or further reduction of the reactants or final product in the presence of reducing chemicals, such as C or gases. Another advantage of limiting the temperature above the melting temperature of the final product is to avoid energy cost and higher cost of furnace equipment when the temperature exceeds 1200° C.

According to another embodiment of the invention, the temperature at which the molten phosphate containing phase is obtained, is between a fixed temperature between 300° C. above the melting point of the lithiated transition metal phosphate material and 200° C., more preferably 100° C. under that melting point, in which case the final lithiated transition metal phosphate is solidified from the melt upon cooling.

The process according to the invention may also be used for preparing a lithiated or partially lithiated transition metal oxyanion-based electrode materials of the nominal formula $AB(XO_4)H$, in which A is lithium, which may be partially substituted by another alkali metal representing less that 20% at. of the A metals, B is a main redox transition metal at the oxidation level of +2 chosen among Fe, Mn, Ni or mixtures thereof, which may be partially substituted by one or more additional metal at oxidation levels between +1 and +5 and representing less than 35% at. of the main +2 redox metals, including 0, $XO_4$ is any oxyanion in which X is either P, S, V, Si, Nb, Mo or a combination thereof, H is a fluoride, hydroxide or chloride anion representing less that 35% at. of the $XO_4$ oxyanion, including 0.

The above electrode materials are preferably phosphate-based and may have an ordered or modified olivine structure.

The process according to the invention may also be used for preparing an electrode material of the nominal formula $Li_{3-x}M'_yM''_{2-y}(XO_4)_3$ in which: $0 \leq x \leq 3$, $0 \leq y \leq 2$; M' and M" are the same or different metals, at least one of which being a redox transition metal; $XO_4$ is mainly $PO_4$ which may be partially substituted with another oxyanion, in which X is either P, S, V, Si, Nb, Mo or a combination thereof. The electrode material preferably has the characteristics of the rhombohedral Nasicon structure.

As used in the present description and claims, the term "nominal formula" refers to the fact that the relative ratio of atomic species may vary slightly, in the order of 0.1% to 5% and more typically from 0.5% to 2%, as confirmed by a common general XRD pattern and by chemical analysis.

The process according to the invention may also be used for preparing a phosphate-based electrode material having the nominal formula $Li(Fe_xMn_{1-x})PO_4$ in which $1 \geq x \geq 0$, which is capable of conducting electricity.

In general, the process and material of the invention can be used to manufacture most of transition metal phosphate-based electrode materials contemplated in previous patent and applications such as described without limitation in U.S. Pat. No. 5,910,382; U.S. Pat. No. 6,514,640 B1, U.S. Pat. No. 6,391,493 B1; EP 0 931 361 B1, EP 1 339 119, and WO 2003/069 701.

The process according to the invention can provide lithiated or partially lithiated transition metal phosphate-based electrode materials that have a partially non-stoichiometric nominal formula, provide solid solutions of the transition metal or of the oxyanion, or slightly doped nominal formula with improved electronic conductivity, and optionally improved ion-diffusion characteristics. The term "improved electronic conductivity" as used in the present description and claims means, in the case of $LiFePO_4$, the improved capacity of the cathode material to conduct electricity by more than one order of magnitude as compared to the conductivity of $LiFePO_4$ obtained by a solid-state synthesis reaction without using any electronic conductivity additive or a phosphate capable of dissipating a charge under SEM observation (without in this case the use of any C or other electronically conductive coating additive, SEM observation that cannot be achieved with pure stoichiometric $LiFePO_4$ material with no conductivity additive for example).

The invention provides a new synthesis process based on the use of a molten phase, preferably a molten phosphate-rich phase, to make lithiated or partially lithiated transition metal phosphate-based electrode materials, wherein the lithiated or partially lithiated transition metal phosphate-based electrode formulations are preferred, first because they are well suited for use in lithium batteries assembled in their discharged (lithiated) state, second, because a lithiated (reduced) electrode formulation allows greater thermal stability to some phosphate crystal structure and also to their corresponding molten form.

According to a preferred embodiment of the present invention, the molten phase comprises at least the cathode material in its molten state before solidification and is obtained by chemically reacting the precursor during the heating or melting steps or simply by melting the precursor which in this case already comprises the at least partially lithiated transition metal phosphate based cathode material.

According to another preferred embodiment of the invention, the atmosphere used during at least the steps of heating and melting is a partially reductive atmosphere. By partially reductive atmosphere, we refer to the fact that the atmosphere comprises gases such as CO, $H_2$, $NH_3$. HC and also $CO_2$, $N_2$, and other inert gases in a proportion and at temperature selected so as to bring or maintained the redox transition metal at a fixed oxidation level, for example +2 in the $AB(XO_4)H$ compounds, without being reductive enough to reduce said redox transition metal to metallic state. By HC we mean any hydrocarbon or carbonaceous product in gas or vapor form.

In the present description and claims, the term "redox transition metal" means a transition metal that is capable of having more than one oxidation state higher than 0, e.g. $Fe^{+2}$ and $Fe^{+3}$, in order to act as an electrode material by reduction/oxidation cycle during battery operation.

According to another embodiment of the invention, an inert or non reactive atmosphere is used and only the thermal conditions and the presence of lithium in the molten transition metal based phosphate phase is used to stabilize the redox transition metal in its desired oxidation state, e.g. $Fe^{+2}$ in the case of $LiFePO_4$.

Another preferred embodiment of the invention is characterized the presence of C or a solid, liquid or gaseous carbonaceous material during at least one of the steps of heating, optionally reacting, and melting, optionally reacting, the electrode precursor. Said C should be chemically inert or compatible (low reactivity) with reaction products during the synthesis, optionally it should be capable of trapping ingress of oxygen traces to keep the redox transition metal in its oxidation state of +2 or in some cases capable of partially or totally reducing the redox transition metal to its oxidation state of +2.

Another preferred embodiment of the invention is characterized by the fact that one or more solid-liquid or liquid-liquid phase separations occur during the melting step thus allowing separation and purification of the molten cathode material from other impurities including C powder, $Fe_2P$, unreacted solids or other solids or liquid non miscible phases, that are present in other phases non-miscible with the liquid molten cathode material. Alternatively, the invention allows for separation and purification during the cooling step where impurities or decomposition products that are soluble in the molten phase can be rejected during the cooling and crystallization step.

According to the process of the invention doping or substitution elements, additives, metals, metalloids, halides, other complex oxyanions $(XO_4)$, and oxide-oxyanions $(O—XO_4)$ systems, where X may be non limitatively Si, V, S, Mo and Nb can be incorporated with the cathode material formulation during the heating, and/or reacting steps or, preferably, while the lithiated transition metal phosphate-based electrode material is in molten state. Examples of doped, non-stoichiometric or partially substituted formulations contemplated by the present invention include but are not limited to those disclosed in U.S. Pat. No. 6,514,640 B1. Other doping effects resulting, for example, from the partial solubility of products resulting from the thermal decomposition of the phosphate electrode precursor are also included in the process and materials of the present invention.

According to another embodiment of the invention, the cooling and solidification step is rapid in order to quench the liquid phase and obtain otherwise metastable non-stoichiometric electrode formulation or doped compositions.

Another of the materials obtained with the process of the invention is the fact that they have intrinsic electronic conducting properties, optionally ionically enhanced Li+ ion diffusion properties while having pure nominal formulation, possibly but not limitatively as a result of some degree of non-stoichiometry with some lithium and transition metal site reciprocal substitution.

Another preferred embodiment of the invention is based on the controlled cooling and crystallization of the molten lithiated transition metal phosphate phase also containing other additives or impurities in order to precipitate such additive or impurities during crystallization or other subsequent thermal treatment in order to make an intimately mixed composite material made of crystallites of the lithiated transition metal phophosphate cathode material intermixed with at least another phase containing additive or impurities, said phase having electronic or Li+ion diffusion enhancing properties when the composite material is used as an Li–ion reversible electrode.

According to another preferred embodiment of the invention the electrode precursor material comprises a mixture of chemicals containing all elements required and selected to react chemically to give essentially the phosphate-based cathode formulation while in the liquid state. Preferably the chemical used for the electrode precursor are low cost, largely available commodity materials or naturally occurring chemicals including in the case of $LiFePO_4$, iron, iron oxides, phosphate minerals and commodity lithium or phosphate chemicals such as: $Li_2CO_3$, $LiOH$, $P_2O_5$, $H_3PO_4$, ammonium or lithium hydrogenated phosphates. Alternatively the chemical are combined or partially combined together to facilitate the synthesis reaction during the heating or melting steps.

Carbonaceous additive, gases or simply thermal conditions are used to control the redox transition metal oxidation level in the final lithiated product.

In another embodiment, the process is characterized by the fact that the molten process is carried out in the presence of a C crucible and lid and uses an inert or slightly reductive atmosphere at a temperature ranging preferably between 700 and 1200° C., more preferably between 900 and 1100° C. Alternatively a somewhat lower temperature can be used if a melting additive is used during the heating and/or melting steps. By melting additive one means low temperature melting phosphate chemicals (e.g. $P_2O_5$, $LiH_2PO_4$, $Li_3PO_4$, $NH_4H_2PO_4$, $Li_4P_2O_7$, for example) or other low temperature melting additive, LiCl, LiF, LiOH that may contributes to the final phosphate-based electrode formulation during the melting step or after the cooling step.

One important alternative of the invention is characterized by the fact that redox transition metal can be kept at a its lower, lithiated or partially lithiated discharged state during the heating, optionally including a reacting step and during the melting, optionally including a reacting step without any reductant additive, such as C, and under an inert atmosphere by the sole use of a heating and melting temperature high enough to insure thermal stability or reduction of the redox metal at the lower discharged state in a chemical formulation stabilized by the presence of lithium ion. Some embodiments of the invention confirm the fact that $LiFePO_4$ or $Li(FeMn)PO_4$ mixtures for example can be synthesized and/or melted indifferently from a $Fe^{+2}$, from a $Fe^{+2}/Fe^{+3}$ mixture, from a $Fe^{0}/Fe+3$ mixture or a purely $Fe^{+3}$ containing precursor, and this without C or other reductive additives or atmospheres.

Advantages of the Invention

Some of the advantages of a process (and material so obtained) based on the melting of a lithiated or partially lithiated redox transition metal oxyanion, such as phosphate-based formulation and of the electrode materials obtained thereby will appear from the following examples of the present invention.

To one skilled in the art, a molten-phase manufacturing process offers the possibility of a rapid and low cost process to synthesize or transform phosphate based electrode materials as opposed to a solid-state synthesis and/or a sintering reaction. Furthermore, chemically combining the precursor components before and especially during the melting step allows for a direct melt-assisted synthesis from a large range of available commodity chemicals, including naturally occurring minerals as starting reactants.

Despite the fact that the melting step is usually carried out at relatively high temperature, for example between 900-1000°, the process allows a solid-liquid or liquid-liquid phase separation that contributes to lithiated transition metal phosphate-based electrode material purification when the precursor is already a crude lithiated transition metal phosphate-based made by synthesizing chemical elements that form an impure liquid phase of the lithated transition metal phosphate material. All means of heating known to the specialist are contemplated by the present invention including combustion, resistive and inductive heating means applicable to a large batch or to a continuous process.

The process can be carried out in the presence of C or other reducing additives or atmospheres or without any reducing agent, by simply selecting the temperature at which the electrode material is heated and melted thus allowing different conditions for preparing different lithiated phosphate-based electrode materials with different redox metals and different defective or doped crystal structures.

The melting and cooling steps result in electrode materials of a relatively high particle top density form in a range of different particle sizes and distributions as obtained by grinding, sieving and classifying by means known in the battery, paint or ceramic art.

Furthermore, pure, doped, or partially substituted electrode material of complex formulations can be made easily and rapidly through solubilization of the additive elements in the molten phase, which are thereafter cooled and solidified in their crystalline form to expel partially or totally the additives from the crystal structure or, alternatively, in their amorphous or crystal defective form by rapid quenching for example in order to optimize electronic conductivity or Li-ion diffusion. A preferred mode of realization is take advantage of thermal treatment of additive solubility in the molten phase to form doped electrode material containing the lithiated transition metal phosphate-based electrode material and/or or composite material with a separate phase containing part or totality of the additive. Such doped or composite electrode material having improved electronic conductivity or improved Li-ion diffusivity.

The process of the invention also allows reprocessing or purifying of synthetic lithiated or partially lithiated transition metal phosphate-based electrode materials or alternatively of lithiated transition metal phosphate natural ores at any steps of the heating/melting/cooling process.

Another characteristic of the invention is to allow ease of control of the particle size and distribution by first melting, then cooling dense phosphate-based electrode materials followed by any of appropriate conventional crushing, grinding, jet milling/classifying/mecanofusion techniques. Typical particle or agglomerate sized that are available to one skilled in the art range between hundredth or tenth of a micron to several microns.

Since the process allows to synthesize a pure electrode material, especially without C, any ulterior C coating or addition independently of the synthesis process as well as any other surface treatment known to one skilled in the art becomes easy to make and control.

A process based on a molten step allows major process simplifications versus other known solid state processes for making phosphate-based cathode materials since the molten process of the invention allows the use of mixtures of largely available raw chemicals or even of natural minerals as well as of pre-synthesized electrode materials as precursor. Presently, known solid state reaction processes require intimate mixing of the reactant powders and relatively long residence time for the synthesis reaction to be completed. On the contrary, a molten phase at high temperature allows rapid mixture and synthesis reaction as well as the introduction of additives, substitution elements and dopants in the molten state.

More specifically the molten state facilitates the manufacture of optimized, doped, partially or totally substituted lithiated or partially lithiated phosphate cathode materials containing other metal, halide or oxyanions ($XO_4$) or oxide-oxyanion other that pure phosphates.

One very important characteristic of the process of the invention is that it was found possible to obtain an electrode material of improved electrical conductivity and possibly of greater Li-ion diffusivity, for example intrinsically electronic conductive $LiFePO_4$ was obtained with the process of the invention, i.e. without doping $LiFePO_4$ with other elements than Li, Fe, P and O. Most probably but without limitation, this is the result of an off-stoichiometric composition and/or reciprocal ion site substitution.

Similarly, phosphate-based electrode formulations such as Li(FeMn)PO$_4$, LiFe$_{(0.9)}$Mg$_{(0.1)}$PO$_4$ or doped LiFePO$_4$ were prepared according to the present invention to allow for an optimization of electronic conductivity and high Li-ion diffusion.

In addition to the fact that the present invention allows to use less costly Fe precursors (Fe, Fe$_2$O$_3$, Fe$_3$O$_4$, FePO$_4$ instead of Fe$^{+2}$ phosphates, acetate, oxalates, citrates, etc), the invention also makes it possible to design new structures not available by other solid-state process, e.g., liquid-phase solubilization, substitution and doping followed by quenching or thermal treatment to achieve controlled crystallization or precipitation among others.

Another particularity of the invention is that it offers the possibility to use less pure precursors such as FePO$_4$ or LiFePO$_4$ with larger stoichiometry ratio window and/or with any Fe$^{3+}$/Fe$^{2+}$ ratio since the phase separation in the molten state combined with the heating and melting step temperature can correct stoichiometry, formulation in combination or not with cooling solidification process.

Depending on the redox metals used for the lithiated or partially lithiated phosphate-based formulations, the invention offers the possibility to work under normal air, or in the case of iron containing material, just by using a C container and C lid and simply limiting exposition to air during the heating, melting and cooling steps of the process.

The process of the invention encompass the possibility to prepared inorganic-inorganic composite based on the use of a molten phase that might comprise impurities or additive soluble only in the molten state, more that one liquid molten phase or that might comprise an additional solid phase coexisting with the molten phase thus resulting upon cooling in a composite system containing the solid transition metal phosphate-based electrode material lithiated or partially lithiated and intimately mixed with another solid phase having beneficial electronically or ionically conducting characteristics as an electrode material. Interesting electrochemical results have been achieved also using Cr and especially Mo additive in order to create doped or composite electrode materials made of more or less doped LiFePO4 with a Mo containing phase excluded from the LiFePO4 structure during thermal cooling from the molten state.

EXAMPLES

Example 1

Figure 1:
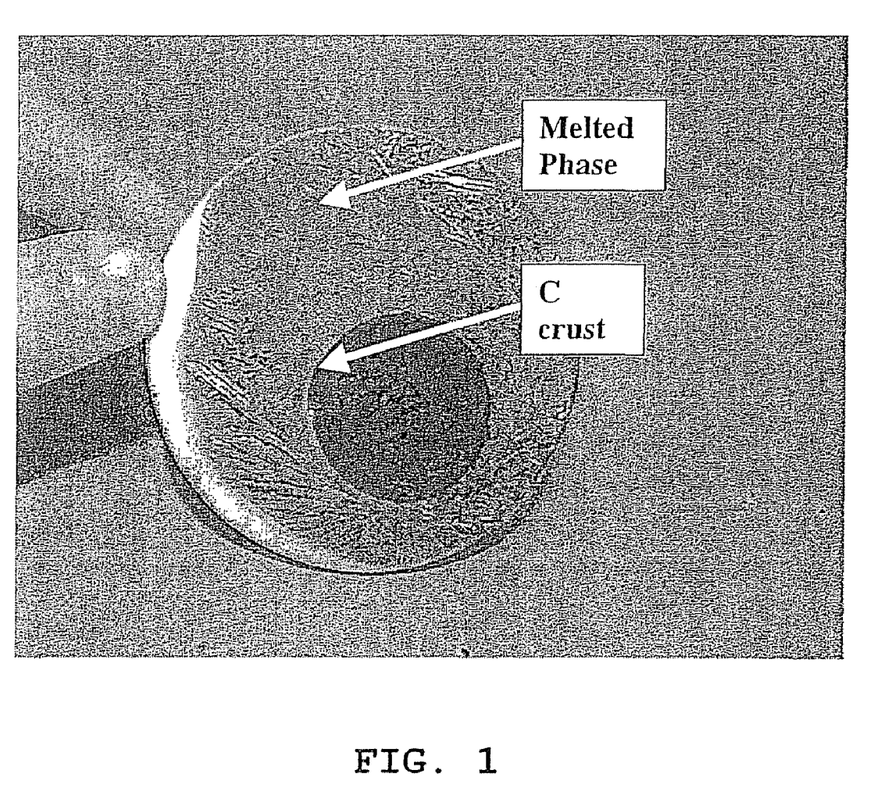
FIG. 1 is an enlarged photography of a C-coated LiFePO$_4$ pressed pellet after melting, showing phase separation between a liquid molten phase and a C containing solid crust-phase.
Figure 2:
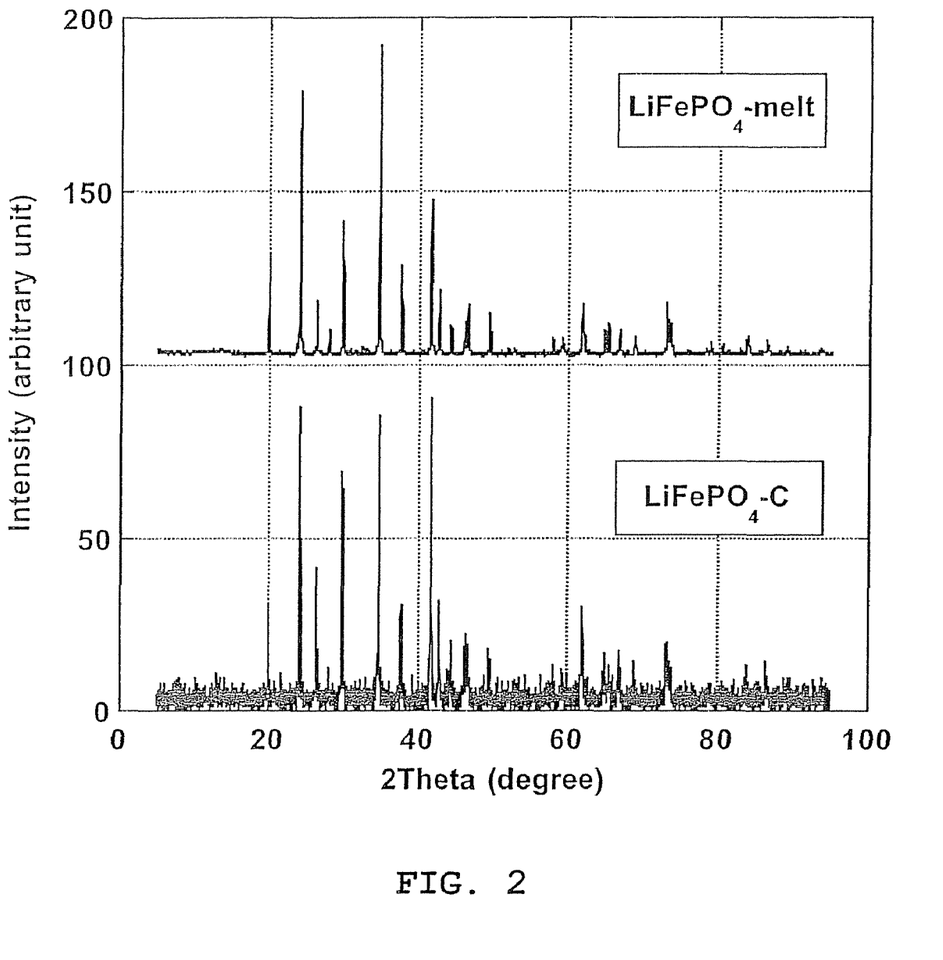
FIG. 2 shows XRD diagrams of original un-melted C-coated LiFePO$_4$ and of the melted phase showing LiFePO$_4$ pattern.

Preparation of LiFePO$_4$ from Carbon Coated Grade Including a Liquid-Molten Phase Step Pure carbon coated LiFePO$_4$ crystals with ≈1.6% wt. carbon coating (designated "LiFePO$_4$—C"), made by solid-state reaction between FePO$_4$, Li$_2$CO$_3$ and an organic carbon coating precursor in reducing atmosphere, according to PCT Application WO 02/27823 A1, has been obtained from Canadian corporation Phostech Lithium Inc (www.phostechlithium.com). 30 g of this compound mixed with ≈10% wt. glycerin was pressed under 55,000 lbs during 5 minutes to give a ≈3" diameter and =8 mm thickness pellet. This pellet was then deposited on an alumina ceramic plate and heated in an airtight oven chamber, maintained under argon with a continuous flow of gas, from ambient temperature to 950° C.±30° C. in 4 hours, left 4 hours at 950° C.±30° C. and then cooled from 950° C.±30° C. to ambient temperature in 8 hours. A grey molten mineral phase was observed, with large crystals formed on cooling that has flowed on most of the ceramic support. Surprisingly, this molten phase has separated from another carbon-based crust phase that has preserved the shape of the original pellet but with a smaller ≈1" diameter (See FIG. 1). The melted mineral material of the melted phase was then separated from its carbon crust for analysis. X-ray diffraction (XRD) especially proved that surprisingly the melt phase was found to consist mainly of LiFePO$_4$ (identified as "LiFePO$_4$-melt"). Phase composition results as determined by XRD of the LiFePO$_4$-melt powder, obtained by grinding crystals in a mortar, are summarized in Table 1 in comparison to composition results for the original carbon coated LiFePO$_4$ before the melting step. The XRD spectra of powdered LiFePO$_4$-melt is provided in FIG. 2 as compared to the XRD spectra of LiFePO$_4$—C before heat treatment.

TABLE 1

XRD composition of LiFePO$_4$ before and after treatment with a tentative attribution of the minor phase, (a) MnO$_2$-ramsdellite phase is a tentative attribution, since pure Fe samples with no Mn were used for the experiments.

| Mineral | LiFePO$_4$—C | LiFePO$_4$-melt |
| --- | --- | --- |
| LiFePO$_4$-triphylite | 91.68% | 94.01% |
| Li$_3$PO$_4$ | 2.05% | 0.97% |
| LiFe$_5$O$_8$ | 1.08% | 0.00% |
| Li$_4$P$_2$O$_7$ | 0.97% | 1.67% |
| Fe$_3$(PO$_4$)•8H$_2$O | 0.76% | 0.00% |
| LiFeP$_2$O$_7$ | 2.81% | 0.00% |
| Li$_6$P$_6$O$_{18}$•H$_2$O | 0.00% | 0.70% |
| Li$_8$P$_8$O$_{24}$•6H$_2$O | 0.00% | 1.57% |
| Fe$_2$O$_3$ | 0.65% | 0.00% |
| MnO$_2$-ramsdellite (a) | 0.00% | 1.08% |
| Total | 100% | 100% |
| Cristallinity | 69.50% | 64.90% |

Remarkably also, as shown in Table 1, the LiFePO$_4$ phase content increases from 91.7% to 94% (a 2.54% increase) after the melting treatment. It is assumed that this is to be linked to LiFePO$_4$ purification during melting through liquid phase separation and expulsion of solid impurities like carbon from LiFePO$_4$—C and other impurities or products from secondary reactions resulting for heating melting steps. A LECO experiment (C analysis) performed on the $LiFePO_4$-melt phase confirms the separation of the $LiFePO_4$ liquid-molten phase from the carbon coating as $LiFePO_4$-melt is free of carbon. Concurrently, the XRD analysis of the C crust confirms the presence of $Fe_2P$ associated with some residual $LiFePO_4$ with a few percent lithium pyrophosphate and lithiated iron oxides impurities. This first example clearly shows the feasibility of preparing $LiFePO_4$ in the molten state without significant decomposition of the material, furthermore, the phase separation observed during the melting process has the beneficial effect of separating $LiFePO_4$ liquid phase from residual impurities, carbon if any and decomposition products associated with the high thermal treatment. Another practical benefit of this melting process is to lead to $LiFePO_4$ in a dense form, crystalline or not depending on the cooling temperature profile. Powdered melted $LiFePO_4$ has a tap density of 2.4 as opposed to 1.24 for the original $LiFePO_4$—C. A high temperature DSC test was performed on $LiFePO_4$—C and $LiFePO_4$-melt, confirming that $LiFePO_4$ melts without decomposition, with a broad fusion peak having a top close to 980° C.

Example 2

Electrochemical Characterization of $LiFePO_4$ Obtained by Melting Process

Electrochemical characterization of the $LiFePO_4$-melt product of Example 1 was made to confirm the performance of the process of the invention. A ≈5 g $LiFePO_4$-melt was thoroughly crushed and grinded in an agate mortar. Subsequently the melted $LiFePO_4$ powder was C-coated using an organic C-precursor: 1,4,5,8-naphthalenetetracarboxylic dianhydride treatment as described by Marca M. Doeff et al (Electrochemical and Solid-State Letters, 6(10) A207-209 (2003)). Thus, $LiFePO_4$-melt (3.19 g) was grinded in a mortar with 1,4,5,8-naphthalenetetra-carboxylic dianhydride (0.16 g; product of Aldrich) and 10 ml acetone. After evaporation of acetone, the mixed was heated under a $CO/CO_2$ (50% volume of each gas) flow in a rotary chamber placed in an oven. The chamber was first air evacuated by flowing $CO/CO_2$ during 20 nm at ambient temperature, heated to 650± C.±5° C. in 100 nm and maintained at this temperature for 60 nm and then cooled to ambient temperature. This process gave a carbon coated grade of $LiFePO_4$-melt (designated "C—$LiFePO_4$-melt") with a 0.33% wt. C-coating (LECO). The C—$LiFePO_4$-melt has a tap density of 1.9 as opposed to 1.24 for the original $LiFePO_4$—C.

Figure 3:
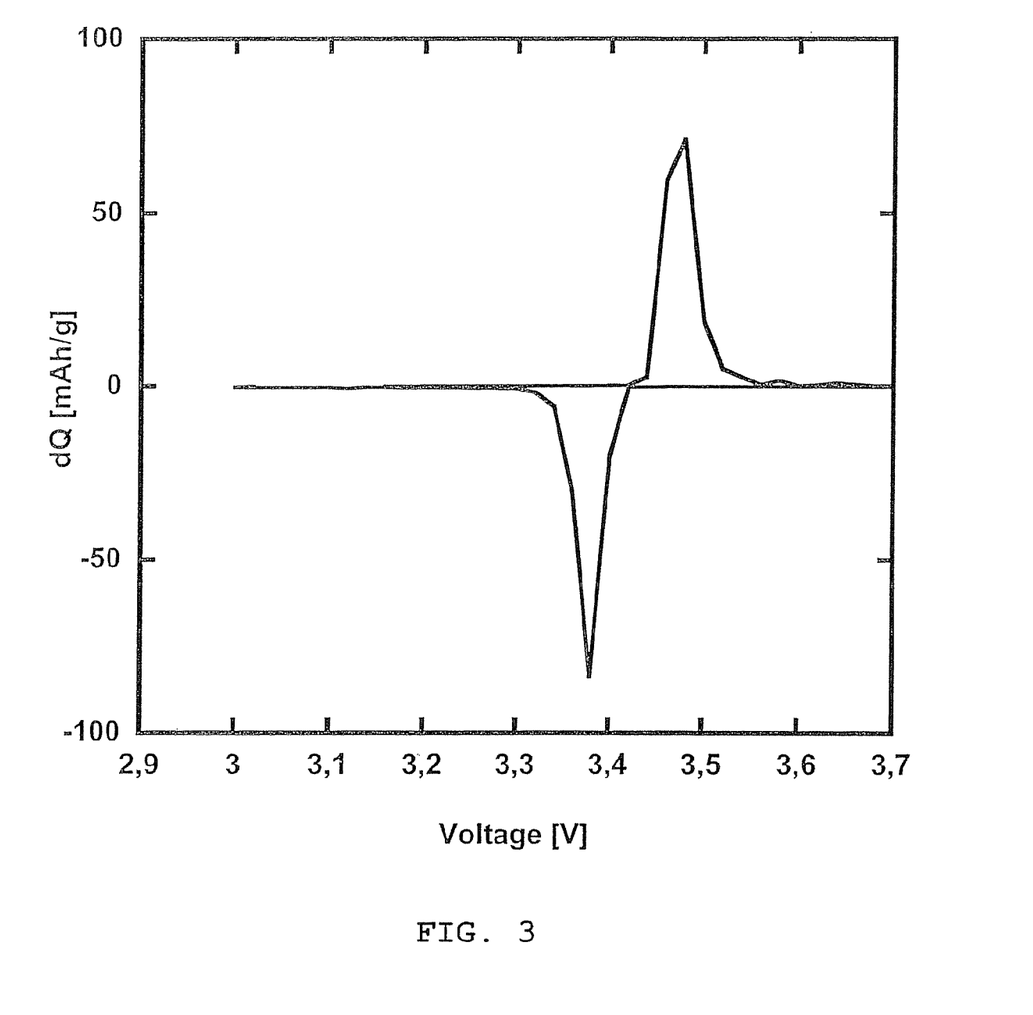
FIG. 3 is a cyclic voltametric diagram (20 mv/h) of a polymer electrolyte battery test at 80° C. and using carbonated LiFePO$_4$-melt as cathode; incremental capacity (dQ) is provided in function of voltage Li$^+$/Li$^0$ . . . .

A cathode coating slurry was prepared by thoroughly mixing with acetonitrile, C—$LiFePO_4$-melt (101.3 mg), polyethylene oxide (product of Aldrich; 82.7 mg), 400,000 molecular weight, and Ketjenblack (product of Akzo-Nobel; 16.7 mg) carbon powder. This slurry was coated on a stainless steel support of 1.539 $cm^2$ area whose composition is: 41% wt. polyethylene oxide, 7.46% wt. Ketjenblack and 51.54% wt. C—$LiFePO_4$-melt. A button type battery has been assembled and sealed in a glove box using a 1.97 mg active material cathode loading (1.28 $mg/cm^2$, 0.78 $C/cm^2$), a polyethylene oxide $5.10^6$ (product of Aldrich) containing 30% wt. LiTFSI (product of 3M) electrolyte and a lithium foil as anode. The battery was then tested with a VMP2 multichannel potensiostat (product of Bio-Logic—Science Instruments) at 80° C. with a 20 mV/hr scan speed, between a voltage of 3.0 V and 3.7 V vs $Li^+/Li^0$. Voltametric scans are reported in FIG. 3 while corresponding coulumbic data relative to theoretical coulumbic value, deduced from weighed active mass, are reported in Table 2. Voltametric scans of C—$LiFePO_4$-melt (See FIG. 3) are similar to $LiFePO_4$—C, used in Example 1, in a lithium polymer battery configuration prepared and tested in the same conditions.

TABLE 2

Coulombic efficiency upon cycling.

| Cycle | Q Charge (Qc) | Q Discharge (Qd) | Qd/Qc | Qd/Qd1 |
|-------|---------------|------------------|-------|--------|
| #1    | 96.7%         | 92.3%            | 95.4% | 100.0% |
| #2    | 94.7%         | 91.5%            | 96.5% | 99.1%  |
| #3    | 93.0%         | 89.8%            | 96.5% | 97.3%  |

This battery test confirms that the electrochemical properties of C—$LiFePO_4$-melt are quite equivalent to un-melted $LiFePO_4$ despite the high temperature treatment and the fact that melting leads to more dense and much larger particles than the original un-treated C-coated $LiFePO_4$. The first discharge coulombic efficiency (92.3%) is closed to the purity of $LiFePO_4$ phase in $LiFePO_4$-melt (94.01%). From an active mass (1.97 mg) and first discharge coulombic efficiency (92.3%) a 156.8 mAh/g specific capacity for $LiFePO_4$-melt was deduced.

Example 3

Purification of $LiFePO_4$ by Melting Process

We have obtained from Phostech Lithium Inc a developmental $LiFePO_4$—C batch with very low carbon coating (<0.1% wt.). This $LiFePO_4$—C was in the form of brown beads ≈5 mm diameter. After crushing into a powder in a mixer, ≈226 grams of this compound was placed in a 100 oz graphite crucible and heated in an airtight oven, under a flow of argon gas, from ambient temperatures to 980° C.±5° C. in ≈100 minutes, maintained at 980° C.±5° C. during 1 hour and then cooled to ≈50° C. in ≈3 hours. During this step, a ≈225 grams±1 g block of crystalline material with a deep green color and long needle on the surface was obtained. This block of crystalline material was then crushed in a mortar and then in a ball mill with toluene during 30 minutes. After drying, a pale green powder was obtained. Then ≈30 grams of this powder, in a 2" ID graphite crucible, was again heat treated under the same conditions as for the 226 grams batch except that cooling was performed during ≈6 hours. In this step, a ≈30 grams±1 g block of crystalline material with a similar aspect as for the 225 grams batch was obtained. XRD spectra of powder have been performed on $LiFePO_4$—C, $LiFePO_4$-melt and $LiFePO_4$-melt remelted a second time. It appears clearly that as in Example 1, the melt process preserves the structure of $LiFePO_4$ and also induced a purification of the compound in terms of $LiFePO_4$ occurrence, from 88.8% for $LiFePO_4$—C to 92.6% for the first melting and 93.7% after two melting processes, corresponding to a 5.5% $LiFePO_4$ purity increase.

In addition, ICP analysis was performed showing a decrease in sulfur content from 1200 ppm for $LiFePO_4$—C to 300 ppm for the first $LiFePO_4$-melt and <100 ppm for the second $LiFePO_4$-melt.

Example 4

Melting and Purification by Phase Separation of Natural Triphylite

Even if triphylite ore occurrence is scarce, there was some interest in evaluating the influence of ore melting on its purity.

Figure 4:
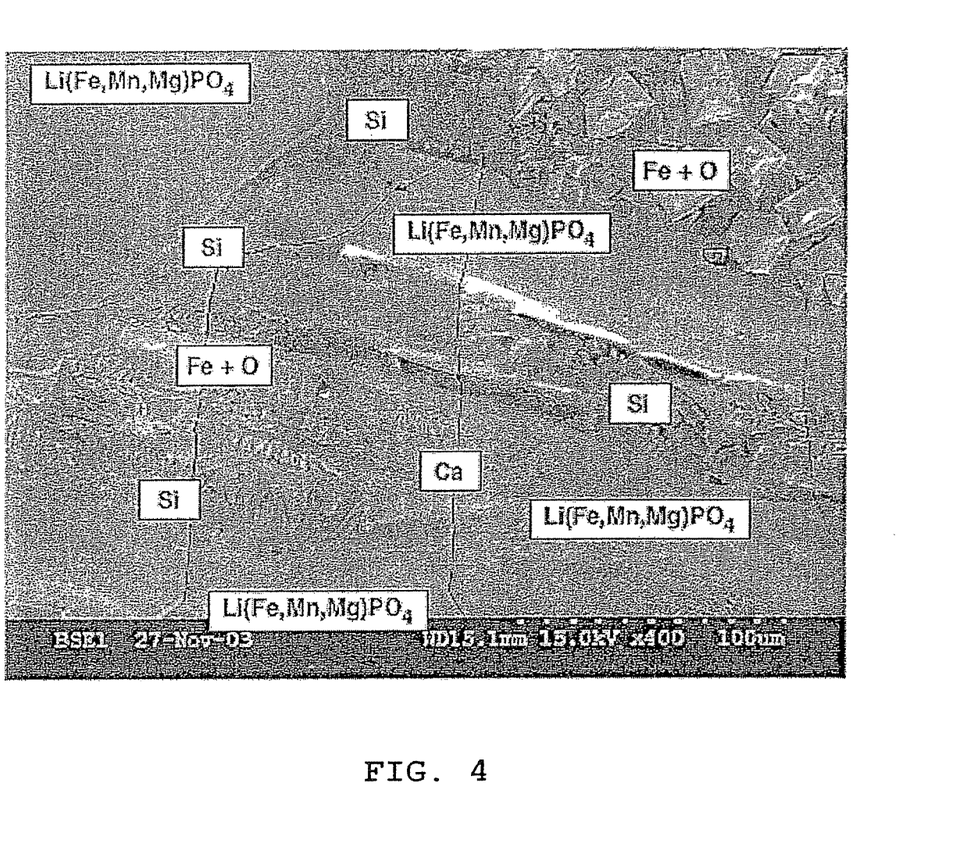
FIG. 4 is an enlarged SEM photo of melt triphylite ore top surface providing composition of main phases determined by X-ray analysis.
Figure 5:
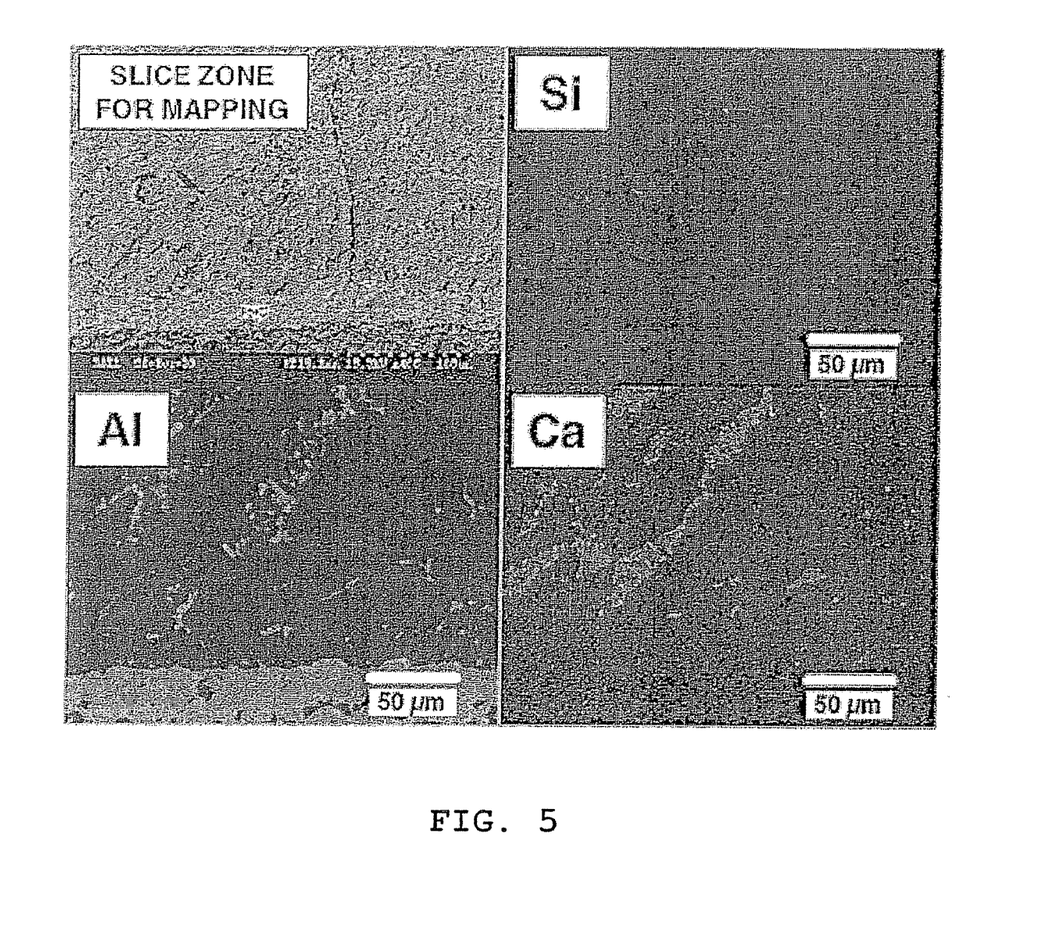
FIG. 5 is an enlarged SEM photo of melt triphylite ore slice and surface mapping composition for Si, Al, and Ca.

Consequently, some ore was purchased from Excalibur Mineral Corp (Peekskill, N.Y., USA). The XRD analysis provided in Table 3 indicates that the ore is mainly $LiFePO_4$ based. A ≈1 cm³ piece of triphylite ore was deposited on an alumina ceramic plate and heated under argon under the same conditions as those used for the 226 g batch of $LiFePO_4$—C of Example 3. After this thermal treatment a ≈1" diameter glossy ore deposit was obtained in the form of a deep green mound. Interestingly, the mat aspect of the top crust seems to indicate a different composition, so it was decided to determine the distribution of the main elements by X-ray analysis on a SEM microscope. Thus, the crystalline plate with the melted ore deposit was encapsulated with an epoxy glue and cut perpendicularly to a main diameter with a diamond cutting tool. First, cartographies of top main elements (Fe, O, P, Mn, Mg, Ca, Si, Al) were established and the results are summarized in FIG. 4. This figure clearly indicates that melting of ore induced liquid-liquid phase and liquid-solid phase separation. Well defined crystals of FeO surrounded by a silicium-based melted rich phase and a calcium-based melted rich phase can especially be observed. The main phase consists of $Li(Fe,Mn,Mg)PO_4$ with relative 25:9:1 atomic ratio of Fe, Mn and Mg, as a consequence of Mn and Mg miscibility in the $LiFePO_4$ main liquid. FIG. 5 provides mapping of a sample slice for Si, Al and Ca, showing probably melted or solid phases, dispersed as inclusions in the same main $Li(Fe,Mn,Mg)PO_4$ phase or segregated during cooling and solidification. The silicium rich phase is composed of Si, Fe, O, Mn, K, P with a relative atomic ratio between Si, O and P of 68:21:4.5, which probably contains silicate and phosphate, dispersed in $Li(Fe,Mn,Mg)PO_4$ with the same composition as observed at the surface. The calcium rich phase is composed of a phosphate containing Ca, Mn, Fe with a relative atomic ratio of 25:25:10, possibly as an olivine phase, dispersed in $Li(Fe,Mn,Mg)PO_4$. The aluminum rich phase is composed of a phosphate containing Fe and Al with a relative atomic ratio of 14:7, dispersed in $Li(Fe,Mn,Mg)PO_4$. This confirms the reorganization of the ore phases upon melting and the separation of "impure" phases as inclusions. Those inclusions can be separated from desired $Li(Fe,Mn,Mg)PO_4$ main phase directly from the melt (phase separation) or after cooling by usual mining processes (crushing, grinding, screening, washing . . . ).

TABLE 3

XRD analysis of Excalibur triphylite ore.

| Mineral | Triphylite Ore |
| --- | --- |
| $LiFePO_4$-triphylite | 63.51% |
| $Fe_3(PO_4)_2$ | 1.92% |
| $Fe_3(PO_4)_2$-graftonite | 4.54% |
| $LiAlPO_4$-amblygonite | 2.20% |
| $KFe_2(OH)(PO_4)_2(H_2O)_2$-leucophosphorite | 4.19% |
| Li(Mn, Fe)$PO_4$-sicklerite | 4.19% |
| $Fe_3(PO_4)_2(OH)2$-lipscombite | 14.91% |
| albite-silicate de Na, Ca | 2.54% |
| $Fe_3O_4$-magnetite | 1.99% |
| Total | 100.00% |
| Cristallinity | 60.30% |

Example 5

Preparation of $LiFePO_4$ Directly from $FePO_4$, $Li_2CO_3$ and C-Precursor Raw Materials All previous experiments have clearly established a strong interest for the fusion process of different forms of synthetic or natural $LiFePO_4$ minerals. In order to extend the scope of this process, we have investigated $LiFePO_4$ synthesis feasibility directly from raw precursors, $FePO_4$, $Li_2CO_3$ and C-precursor, commonly used in $LiFePO_4$ synthesis in reducing atmosphere as described in WO 02/27823 A1. For this, a premixed provided by Phostech Lithium Inc of relative molar ratio 2:1 $FePO_4.2H_2O:Li_2CO_3$ with 0.5% wt. C-precursor was ised. Two 25 oz graphite crucibles were filled with a quantity of ≈5 g of this premixed. One of the crucibles was filled before with ≈100 mg (≈2% wt.) of pure $LiFePO_4$ powder, obtained in Example 1, to act as a reaction media when in the molten state. Both crucibles were then heated in an airtight oven under a flow of argon from ambient temperatures to 980° C.±5° C. in ≈100 minutes, maintained at 980° C.±5° C. during ≈90 nm and then cooled to ambient temperature in ≈6 hours. The crystalline material formed was gray with a metallic aspect and long needles. It was crushed and grinded in a mortar into a grey powder. XRD analysis (See Table 4) indicates that both compounds are mainly $LiFePO_4$, the main difference due to pre-synthesized $LiFePO_4$ addition being a slightly higher yield of $LiFePO_4$ and its crystallinity increase from 73.80% to 78.80%.

TABLE 4

XRD analysis of premixed melt under argon at 980° C. with and without $LiFePO_4$ addition.

| Mineral | 0% $LiFePO_4$ | 2% wt. $LiFePO_4$ |
| --- | --- | --- |
| $LiFePO_4$-triphylite | 91.70% | 92.17% |
| $FePO_4$ | 3.22% | 2.42% |
| $LiFe_5O_8$ | 1.42% | 1.30% |
| $Li_4P_2O_7$ | 0.78% | 0.87% |
| $LiFe(P_2O_7)$ | 1.61% | 1.61% |
| $Li_8P_8O_{24}\cdot 6H_2O$? (a) | 0.93% | 1.30% |
| $Fe_3(PO_4)_2(H_2O)_4$? (a) | 0.34% | 0.31% |
| Total | 100.00% | 100.00% |
| Crystallinity | 73.80% | 78.80% |

Example 6

Preparation of $LiFePO_4$ Directly from $FePO_4$ and $Li_2CO_3$ Raw Precursors

In order to supplement Example 5, $LiFePO_4$ synthesis feasibility directly from raw precursors, $FePO_4$ and $Li_2CO_3$, commonly used in $LiFePO_4$ synthesis in reducing atmosphere as described in WO 02/27823 A1 was investigated. Thus, $FePO_4.2H_2O$ (product of Chemische Fabrik Budenheim KG, Germany; 37.4 g) and battery grade $Li_2CO_3$ (Limtech Lithium Industries Inc, Canada; 7.4 g) were thoroughly mixed in a mortar. This mixture was placed in a 2" ID graphite crucible, slightly compressed with a spatula, and then heated in an airtight oven under a flow of argon from ambient temperatures to 980° C.±5° C. in ≈100 minutes, maintained at 980° C.±5° C. during ≈100 nm and then cooled to ≈50° C. in 3 hours. We have obtained a pellet of melt mineral of 92.3% $LiFePO_4$ purity as determined by XRD. This result and Example 5 implied that the melt process is more general than just $LiFePO_4$ purification or the preparation of non C-coated $LiFePO_4$ from $LiFePO_4$—C and allows the preparation from chemical precursor of the final compound. This result has clearly confirmed that the first surprising $LiFePO_4$-melt preparation was a major opportunity to design an improved and simplified alternative industrial process for $LiFePO_4$ synthesis. Experiment has been repeated under similar conditions with LiOH, LiCl and LiF as lithium source instead of $Li_2CO_3$ and in both case a $LiFePO_4$ of >90% purity was obtained.

Example 7

Preparation of $LiFePO_4$ Directly from $Fe_3(PO_4)_2$ and $Li_3PO_4$ Raw Precursors $Fe_3(PO_4)_2.8H_2O$ (50.16 g) and $Li_3PO_4$ (product of Aldrich; 11.58 g) were thoroughly mixed in a mortar, poured into an alumina ceramic crucible, and then heated in an airtight oven under a flow of argon from ambient temperatures to 980° C.±5° C. in ≈100 minutes, maintained at 980° C.±5° C. during ≈60 nm and then cooled to ≈50° C. in ≈3 hours. A battery was assembled and tested with this material, as described in Example 1, but without carbon coating. Electrochemical response was characteristic of $LiFePO_4$.

Example 8

Stability of $LiFePO_4$ to Air Oxidation at 980° C.

Due to surprising results obtained with the melt process, we were curious to evaluate the stability of pure molten $LiFePO_4$ to air oxidation at 980° C. So, we placed ≈2 g $LiFePO_4$, obtained in Example 1, in an alumina ceramic crucible and placed it in an oven heated at 980° C. under air. After 10 nm, the crucible with the molten $LiFePO_4$ was quickly soaked in water and the collected mineral was crushed and grinded in a mortar to obtain a pale green powder. Surprisingly, $LiFePO_4$, as determined by XRD, is still ≈81% purity (86% of 94% initial purity). We can conclude from this experiment that it is possible to expose molten $LiFePO_4$ during a limited time to air, especially in order to quench it in a liquid such as water or oil or in a gas by a process such as the liquid phase atomization. Another experiment was performed with exposure time at 980° C. under air of 1 nm instead of 10 nm. After quick quenching in water, XRD shows that >95% of the initial $LiFePO_4$ purity was retained. A similar result was obtained by quenching in oil instead of water.

Example 9

Preparation of $LiFePO_4$ directly from $Fe_2O_3$, $(NH_4)_2HPO_4$ and $Li_2CO_3$ Raw Precursors As the melt process is efficient to produce $LiFePO_4$ from raw precursor, we have considered the possibility to produce $LiFePO_4$ from commodity industrial raw materials in view to reduce materials costs of the synthesis. Notably, $FePO_4$ as a chemical specialty represents an important part of materials cost, we have then decided to rely on a process based on $Fe_2O_3$ as the Fe source. Thus, as first experiment, in an agate mortar, we have thoroughly mixed $Fe_2O_3$ (product of Aldrich; 15.97 g), $Li_2CO_3$ (product of Limtech; 7.39 g) and $(NH_4)_2HPO_4$ (product of Aldrich; 26.41 g). This mixture was then placed in a 2" ID graphite crucible and heated in an airtight oven under a flow of argon from ambient temperature to 980° C.±5° C. in ≈100 minutes, maintained at 980° C.±5° C. during ≈60 nm and then cooled to ≈50° C. in ≈3 hours. XRD analysis indicates that we have prepared $LiFePO_4$ with >94% purity. A second experiment has been performed with $Fe_3O_4$ (product of Aldrich; 15.43 g,) instead $Fe_2O_3$, with a final >95% $LiFePO_4$ purity (XRD). A third experiment has been performed with $Fe_2O_3$ (product of Aldrich; 159.7 g) as Fe sources, $Li_2CO_3$ (product of Limtech; 73.9 g) and $(NH_4)_2HPO_4$ (product of Aldrich; 264.1 g). Instead of thoroughly mixing the components in a mortar, they were only hand shaken in a 1 liter Nalgene bottle for less than 1 nm. After heat treatment as previously described, $LiFePO_4$ with >93% purity was obtained. Due to formation of a liquid phase during the synthetic process, intimate mixing of fine particles of components is not essential to obtain high purity product. A fourth experiment was performed with same precursors and quantities as in the first experiment, but precursors were just weighted directly in a 2" ID graphite crucible: $Li_2CO_3$, $Fe_2O_3$, and then $(NH_4)_2HPO_4$ without any mixing. After similar heat treatment as in first experiment, a >90% purity $LiFePO_4$ was obtained. This experiment has been repeated with $(NH_4)H_2PO_4$ instead of $(NH_4)_2HPO_4$ with similar result. Although not optimized for a short reaction time, this example shows the potential for very short reaction time due to efficient mixing and reaction kinetic in the molten state as opposed to presently used synthesis reactions using solids.

Example 10

Preparation of $LiFePO_4$ Directly from $FePO_4$ and $Li_2CO_3$ Raw Precursors

In an agate mortar, we have thoroughly mixed $FePO_4.2H_2O$ (product of Chemische Fabrik Budenheim KG; 74.8 g) and $Li_2CO_3$ (product of SQM, Chile; 14.78 g). This mixed was then poured into a 100 oz graphite crucible covered with another 100 oz graphite crucible and heated in an oven under air from ambient temperatures to 980° C.±5° C. in ≈100 minutes, maintained at 980° C.±5° C. during ≈105 nm and then cooled to ≈100° C. in ≈20 nm. Surprisingly, X-ray diffraction analysis indicates that we have obtained $LiFePO_4$ with 89% purity. It is then shown that in the presence of C or in a graphite crucible, even not tightly sealed, it is possible to melt prepare $LiFePO_4$ under air at 980° C.

Example 11

Preparation of $LiMnPO_4$ Directly from $MnO_2$, $Li_2CO_3$ and $(NH_4)_2HPO_4$ Raw Precursors In an agate mortar, we have thoroughly mixed $MnO_2$ (product of Aldrich; 8.69 g), $Li_2CO_3$ (product of Limtech; 3.69 g) and $(NH_4)_2HPO_4$ (product of Aldrich; 13.21 g). This mixed was then poured into a 2" ID graphite crucible and heated in an airtight oven under a flow of argon from ambient temperatures to 980° C.±5° C. in ≈100 minutes, maintained at 980° C.±5° C. during ≈60 nm and then cooled to ≈50° C. in ≈3 hours. XRD analysis confirms that we have prepared $LiMnPO_4$ with a>94% purity.

Example 12

Preparation of $Li(Fe,Mn)PO_4$ Directly from $MnO_2$, $Li_2CO_3$ $Fe_2O_3$ and $(NH_4)_2HPO_4$ Raw Precursors In an agate mortar, we have thoroughly mixed $MnO_2$ (product of Aldrich; 4.35 g), $Fe_2O_3$ (product of Aldrich; 3.39 g), $Li_2CO_3$ (product of Limtech; 3.69 g) and $(NH_4)_2HPO_4$ (product of Aldrich; 13.21 g). This mixed was then poured into a 2" ID graphite crucible and heated in an airtight oven under a flow of argon from ambient temperatures to 980° C.±5° C. in ≈100 minutes, maintained at 980° C.±5° C. during ≈60 nm and then cooled to ≈50° C. in ≈3 hours. XRD analysis confirms that we have prepared Li(Mn,Fe)PO$_4$ with a >90% purity.

Example 13

Preparation of LiFePO$_4$ Doped by Molybdenum Directly from FePO$_4$, Li$_2$CO$_3$ and MoO$_3$ Raw Precursors In this example we show the possibility of preparing LiFePO$_4$ doped with Mo. In a first experiment (E1), we have thoroughly mixed in an agate mortar FePO$_4$.2H$_2$O (product of Chemische Fabrik Budenheim KG; 18.68 g), Li$_2$CO$_3$ (product of Limtech; 3.66 g) and MoO$_3$ (product of Aldrich; 144 mg). This mixture was then placed into a 2" ID graphite crucible and heated in an airtight oven under a flow of argon from ambient temperatures to 980° C.±5° C. in ≈100 minutes, maintained at 980° C.±5° C. during ≈60 nm and then cooled to ≈50° C. in ≈3 hours. A second experiment (E2) has been performed with FePO$_4$.2H$_2$O (18.68 g), Li$_2$CO$_3$ (product of Limtech; 3.58 g) and MoO$_3$ (432 mg). XRD analyses provided in Table 5 were characteristic of pure LiFePO$_4$ with respectively 97.8% (E1) and 96.4% (E2) purities. Tentative attributions of Mo phases were also provided.

TABLE 5

XRD analysis for E1 and E2.

| Mineral | E1 | E2 |
|---|---|---|
| LiFePO$_4$-triphylite | 97.80% | 96.40% |
| Li$_3$FeMoO$_{12}$/Li$_3$Fe(MoO$_4$)$_3$? | 0.95% | 0.39% |
| LiMoO$_2$? | 0.00% | 1.63% |
| LiFe(P$_2$O$_7$) | 0.83% | 1.07% |
| Fe$_3$(PO$_4$)$_2$? | 0.41% | 0.51% |
| Total | 100.00% | 100.00% |
| Crystallinity | 71.90% | 69.70% |

Figure 6:
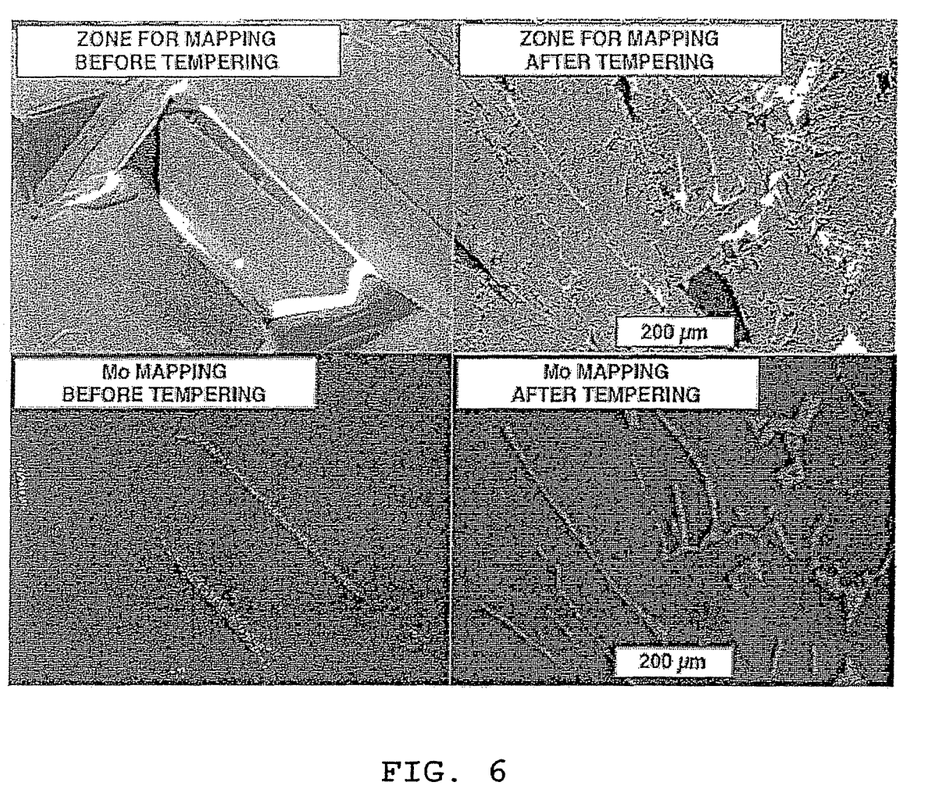
FIG. 6 is an enlarged SEM photo of Mo doped LiFePO$_4$-melt and Mo surface mapping composition both before and after tempering (quenching).

MEB observation of E2 sample indicates that we have been able to prepare a composite material made of LiFePO$_4$ and a Mo rich phase deposited at grains boundaries (See FIG. 6). Distribution of E2 main elements, determined by X-ray analysis in SEM microscope, seems to indicate that Mo interphase was a Mo rich phosphate phase containing also Fe. We have also observed that Mo addition reduced size of crystallite. Furthermore, grinding of E2 sample provides a blue colored powder that might be linked, although not limitatively, to partial dissolution of Mo in LiFePO$_4$ phase and/or to ionic defects, complexed transition metal ion, or colored center induction in the LiFePO$_4$ crystalline structure.

A battery was assembled and tested with this material, as described in Example 1, but without carbon coating. Electrochemical response was characteristic of LiFePO$_4$ with first charge coulombic efficiency of 76% (129 mAh/g) and first discharge corresponding to 95% of charge capacity (122 mAh/g). However, considering that no C-coating is used, the utilization rate (capacity) is surprisingly high, suggesting a higher electronic conductivity or Li-ion diffusivity in the Mo-added LiFePO$_4$ phase.

Example 14

Tempering of Mo Doped LiFePO$_4$ 500 mg of the material prepared in Example 13 was sealed under vacuum in a quartz ampula. After heat treatment at 980° C. during 10 nm, the ampula was immediately quenched in water. The quenched material was analyzed as in Example 13 by microscopy including Mo SEM mapping (See FIG. 6). Quenching induces disorder of material and finer distribution but still keeps a Mo rich phase outside the LiFePO$_4$ crystal structure.

Example 15

Preparation of LiFePO$_4$ Doped by Chromium Directly from FePO$_4$, Li$_2$CO$_3$ and Cr$_2$O$_3$ Raw Precursors We intended to explore the possibility of preparing LiFePO$_4$ doped with Cr. In a first experiment (E1), we have thoroughly mixed in an agate mortar FePO$_4$.2H$_2$O (18.68 g), Li$_2$CO$_3$ (3.58 g) and Cr$_2$O$_3$ (product of Aldrich; 76 mg). This mixed was then poured in a 2" ID graphite crucible and heated in an airtight oven under a flow of argon from ambient temperatures to 980° C.±5° C. in ≈100 minutes, maintained at 980° C.±5° C. during ≈80 nm and then cooled to ≈50° C. in ≈3 hours. A second experiment (E2) was performed with FePO$_4$.2H$_2$O (18.68 g), Li$_2$CO$_3$ (3.36 g) and Cr$_2$O$_3$ (228 mg). XRD analyses (See Table 6) were characteristic of LiFePO$_4$ with respectively 91.5% (E1) and 89.2% (E2) purities but show the presence of electronically conductive metallic Cr.

TABLE 6

XRD analysis for E1 and E2.

| Mineral | E1 | E2 |
|---|---|---|
| LiFePO$_4$-triphylite | 91.53% | 89.17% |
| Fe$_3$O$_4$ | 0.32% | 0.83% |
| LiFe(P$_2$O$_7$) | 2.89% | 4.36% |
| Li$_8$P$_8$O$_{24}$•6H$_2$O | 2.00% | 2.25% |
| Cr | 2.00% | 2.50% |
| FeO | 0.37% | 0.29% |
| Carbon | 0.89% | 0.59% |
| Total | 100.00% | 100.00% |
| Crystallinity | 70.60% | 69.80% |

Example 16

Preparation of LiFePO$_4$ Directly from FePO$_4$ and Li$_2$CO$_3$ Raw Precursors Under CO/CO$_2$ Atmosphere in the Absence of C Additive or Graphite Crucible We have thoroughly mixed in an agate mortar FePO$_4$.2H$_2$O (37.37 g) and Li$_2$CO$_3$ (7.39 gr). This mixed was then placed in an alumina ceramic crucible and heated in an airtight oven under a flow of CO/CO$_2$ (3:1) from ambient temperatures to 980° C.±5° C. in ≈100 minutes, maintained at 980° C.±5° C. during ≈60 nm and then cooled to ≈50° C. in ≈3 hours. A battery was assembled and tested with this material, as described in Example 1, but without carbon coating. Electrochemical response was characteristic of LiFePO$_4$.

Example 17

Preparation of LiFePO$_4$ Directly from Fe$_2$O$_3$, (NH$_4$)$_2$HPO$_4$ and Li$_2$CO$_3$ Raw Precursors Under Inert Atmosphere and in the Absence of C Additive or Graphite Crucible We have thoroughly mixed in an agate mortar Fe$_2$O$_3$ (15.98 g), Li$_2$CO$_3$ (7.39 g) and (NH$_4$)$_2$HPO$_4$ (26.4 g). This mix was then poured in an alumina ceramic crucible and heated in an airtight oven under a flow of argon from ambient temperatures to 980° C.±5° C. in ≈100 minutes, maintained at 980° C.±5° C. during ≈60 nm and then cooled to ≈50° C. in ≈3 hours. A battery was assembled and tested with this material, as described in Example 1, but without carbon coating. Electrochemical response was characteristic of $LiFePO_4$.

Example 18

Preparation of $LiFePO_4$ Directly from $Fe_2O_3$ and $LiH_2PO_4$ Raw Precursors Under Inert Atmosphere Starting from a Fe+3 Reactant without C Additive or Graphite crucible We have thoroughly mixed in an agate mortar $Fe_2O_3$ (15.98 g) and $LiH_2PO_4$ (product of Aldrich; 20.8 g). This mix was then poured in an alumina ceramic crucible and heated in an airtight oven under a flow of argon from ambient temperatures to 980° C.±5° C. in ≈100 minutes, maintained at 980° C.±5° C. during ≈60 nm and then cooled to ≈50° C. in ≈3 hours. A battery was assembled and tested with this material, as described in Example 1, but without carbon coating. Electrochemical response was characteristic of $LiFePO_4$ showing that thermal reduction of Fe+3 into a lithiated iron+2 phosphate is possible.

Example 19

Preparation of $LiFePO_4$ Directly from Fe, $Fe_2O_3$ and $LiH_2PO_4$ Raw Precursors Under an Inert Atmosphere in the Absence of C Additive or Graphite Crucible but in the Presence of Fe° as a Reducing Agent We have thoroughly mixed in an agate mortar Fe (product of Aldrich; 5.58 gr), $Fe_2O_3$ (15.97 g) and $LiH_2PO_4$ (31.18 g). This mix was then poured in an alumina ceramic crucible and heated in an airtight oven under a flow of argon from ambient temperatures to 1000° C.±5° C. in 100 minutes, maintained at 1000° C.±5° C. during ≈60 nm and then cooled to 50° C. in ≈3 hours. A battery was assembled and tested with this material, as described in Example 1, but without carbon coating. Electrochemical response was characteristic of $LiFePO_4$.

Example 20

Preparation of $LiFePO_4$ Directly from Fe and $LiH_2PO_4$ Raw Precursors under a $CO/CO_2$ Atmosphere We have thoroughly mixed in an agate mortar Fe powder (11.17 g) and $LiH_2PO_4$ (20.79 g). This mix was then poured in an alumina ceramic crucible and heated in an airtight oven under a flow of $CO/CO_2$ from ambient temperatures to 980° C.±5° C. in ≈100 minutes, maintained at 980° C.±5° C. during ≈60 nm and then cooled to ≈50° C. in 3 hours. A battery was assembled and tested with this material, as described in Example 1, but without carbon coating. Electrochemical response was characteristic of $LiFePO_4$. This example shows that a buffered gas mixture such as $CO/CO_2$ can oxidize $Fe^0$ to Fe+2 in the conditions of the process of the invention.

Example 21

Preparation of Magnesium Doped $LiFePO_4$ Directly from $Fe_2O_3$, $Li_2CO_3$, $(NH_4)_2HPO_4$ and $MgHPO_4$ Raw Precursors We have thoroughly mixed in an agate mortar $Fe_2O_3$ (15.17 g), $Li_2CO_3$ (7.39 g), $(NH_4)_2HPO_4$ (25.09 g) and $MgHPO_4$ (product of Aldrich. 1.2 g). This mix was then poured in a 2" ID graphite crucible and heated in an airtight oven under a flow of argon from ambient temperatures to 980° C.±5° C. in ≈100 minutes, maintained at 980° C.±5° C. during ≈60 nm and then cooled to ≈5° C. in ≈3 hours. XRD and ICP analysis indicates that we have obtained $LiFe_{0.95}Mg_{0.5}PO_4$ olivine solid solution with >90% purity.

Example 22

Preparation of $LiFePO_4$ Directly from $Fe_2O_3$ and $LiH_2PO_4$ Raw Precursors We have thoroughly mixed in an agate mortar $Fe_2O_3$ (15.98 g), $LiH_2PO_4$ (20.8 g) and EBN1010 graphite powder (product of Superior Graphite; 1.2 g). This mix was then placed in an alumina ceramic crucible and heated in an airtight oven under a flow of argon from ambient temperatures to 980° C.±5° C. in ≈100 minutes, maintained at 980° C.±5° C. during ≈60 nm and then cooled to ≈50° C. in ≈3 hours. We have obtained a crystalline material with a small crust mainly composed of carbon at its surface. Ceramic has been identified by XRD as $LiFePO_4$ of >90% purity. A second similar experiment has been performed with same quantities of $Fe_2O_3$ and $LiH_2PO_4$ but with 600 mg of graphite instead of 1.2 g. Thus, we have obtained a >90% purity $LiFePO_4$.

Example 23

Electrochemical characterization of $LiFePO_4$: A 2 kg quantity of $LiFePO_4$ (94% purity by XRD) was prepared, in several batches, as disclosed in the first experiment of Example 9 from $Fe_2O_3$, $(NH_4)_2HPO_4$ and $Li_2CO_3$. Those 2 kg were summarily crushed in an alumina mortar in the form of ≈1 mm chunk. A batch of $LiFePO_4$ was further ground with a planetary mill PM 100 (Product of Retsch GmbH & Co. KG, Germany). Thus, 200 g of $LiFePO_4$ were wet milled during 10 nm with 12 g of 20 mm zirconia balls in a zirconia jar and further during 90 nm with 440 g of 3 mm zirconia balls, in both case with 90 cc iso-propanol. Particle size and distribution is provided in Table 7, mean size was 1.44 µm.

TABLE 7

| Size distribution after planetary mill milling | | | |
|---|---|---|---|
| Diameter on % | Size (µm) | Size (µm) | % on Diameter |
| 5% | 0.38 | 100 | 100% |
| 10% | 0.43 | 50 | 100% |
| 20% | 0.54 | 5 | 99.4% |
| 30% | 0.72 | 1 | 40.8% |
| 40% | 0.98 | 0.5 | 16.6% |
| 60% | 1.46 | 0.1 | 0% |
| 70% | 1.75 | | |
| 80% | 2.15 | | |
| 90% | 2.83 | | |
| 95% | 3.44 | | |

Figure 7:
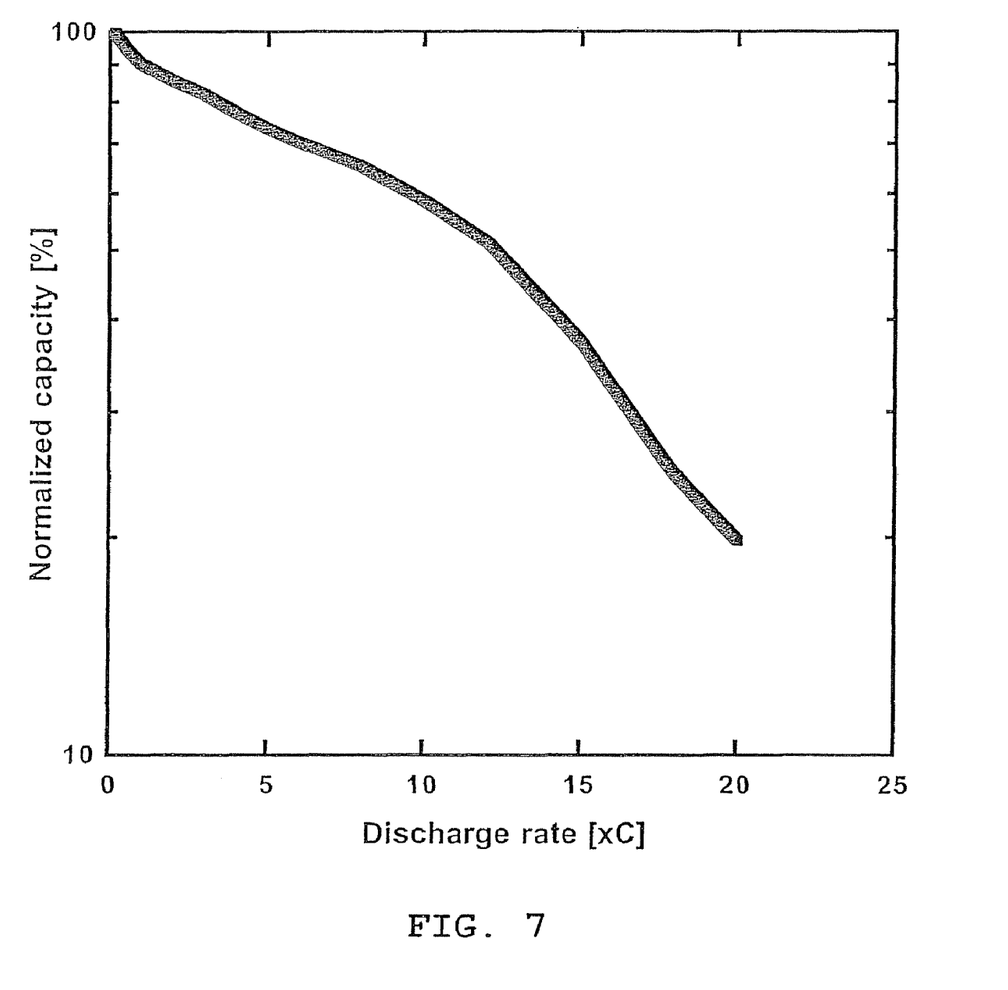
FIG. 7 is a power test of a liquid electrolyte battery using LiFePO$_4$- melt as cathode; cathode capacity has been normalized with nominal capacity (159.9 mAh/g) and determined for various discharge rate xC, x representing time to discharge nominal capacity in 1/x hours.

20 gr of planetary mill ground $LiFePO_4$ were mixed with 6% wt. cellulose acetate (product of Aldrich) dissolved in acetone. This mixture was then dried and treated at 700° C. for 1 hour under an argon atmosphere, quantity of carbon remaining in the material was 1.23% wt. as determined by elementary analysis. Composite cathodes electrodes were prepared with the carbon-coated material, EBN1010 (product of Superior Graphite) as conductive agent and PVdF as binder in 80/10/10 wt. proportions. Density of these coatings was 1.7, instead of 1.2 with similar coating using $LiFePO_4$—C disclosed in Example 1, corresponding to a 40% increase of the coating density. Electrochemical performances of cathode coating were investigated at room temperature in coin cell battery using metallic lithium as anode and 1M $LiClO_4$ in EC:DMC (1:1) impregnated in 25 μm polypropylene Celgard® as electrolyte. Cathode surface was 1.5 $cm^2$ with 4.4 mg/$cm^2$ $LiFePO_4$ loading. A first slow scan voltametry (20 mV/h), between a voltage of 3.0 V and 3.7 V vs $Li^+/Li^0$ was performed at ambient temperature with a VMP2 multichannel potensiostat (product of Bio-Logic—Science Instruments). Power tests were further performed by intentiostatic experiment (See FIG. 7), rates were calculated from the specific capacity value obtained from first slow scan voltametry (159.9 mAh/g). $LiFePO_4$ prepared from low cost precursors by melt process and grinded by currently available milling machinery can sustain high rates.

Alternative grinding was also performed with a laboratory Jet-Mill, adjusting conditions (time, air flow, . . . ), to obtain a $LiFePO_4$ powder with 1 to 5 μm mean size.

Of course, the above description of the embodiments of the invention is not limitative and also comprises all possible variations and embodiments that may seem obvious to a man skilled in the art.

The invention claimed is:

1. A pure, partially substituted or doped lithium-ion reversible electrode material, said material having a particle size distribution comprising micron size particles and submicron size particles, said micron size particles and submicron size particles having the nominal formula $AB(XO_4)H$ in which:
- A is lithium, which may be partially substituted with another alkali metal representing less than 20% at. of said A;
- B is a main redox metal at oxidation level of +2 selected from the group consisting of Fe, Mn, Ni and any mixture thereof, which may be partially substituted by one or more additional metal at oxidation level between +1 and +5 and representing less than 35% at. of said main +2 redox metal, including 0;
- $XO_4$ is any oxyanion wherein X is selected from the group consisting of P, S, V, Si, Nb, Mo and any combination thereof; and
- H is a fluoride, hydroxide or chloride anion representing less that 35% at. of the $XO_4$ oxyanion, including 0.

2. The electrode material according to claim 1, wherein A is lithium, partially substituted with another alkali metal representing less than 20% at. of said A.

3. The electrode material according to claim 2, wherein B is a main redox metal at oxidation level of +2 selected from the group consisting of Fe, Mn, Ni and any mixture thereof, partially substituted by one or more additional metal at oxidation level between +1 and +5 and representing less than 35% at. of said main +2 redox metal, including 0.

4. The electrode material according to claim 1, wherein said micron size particles have a particle size distribution that includes a plurality of micron sizes.

5. The electrode material according to claim 1, wherein said submicron size particles have a particle size distribution that includes a plurality of submicron sizes.

6. The electrode material according to claim 1, wherein said micron size particles have a particle size distribution that includes a plurality of micron sizes and said submicron size particles have a particle size distribution that includes a plurality of submicron sizes.

7. The electrode material according to claim 1, wherein said electrode material has the nominal formula $LiFePO_4$.

8. The electrode material according to claim 6, wherein said electrode material has the nominal formula $LiFePO_4$.

9. The electrode material according to claim 1, wherein said material has a particle size distribution comprising up to 40% of submicron size particles.

10. The electrode material according to claim 6, wherein said material has a particle size distribution comprising up to 40% of submicron size particles.

11. The electrode material according to claim 8, wherein said material has a particle size distribution comprising up to about 40% of submicron size particles.

12. The electrode material according to claim 1, wherein said particles have a mean size of about 1.5 μm.

13. The electrode material according to claim 1, wherein said particles have a mean size of about 1 μm to about 5 μm.

14. The electrode material according to claim 1, wherein said particles have a pyrolytic carbon deposit.

15. The electrode material according to claim 7, wherein said particles have a pyrolytic carbon deposit.

16. The electrode material according to claim 8, wherein said particles have a pyrolytic carbon deposit.

17. The electrode material according to claim 11, wherein said particles have a pyrolytic carbon deposit.

18. A cathode electrode comprising the electrode material according to claim 1.

19. cathode electrode comprising the electrode material according to claim 6.

20. A cathode electrode comprising the electrode material according to claim 7.

21. A cathode electrode comprising the electrode material according to claim 8.

22. A cathode electrode comprising the electrode material according to claim 14.

23. A cathode electrode comprising the electrode material according to claim 15.

24. A cathode electrode comprising the electrode material according to claim 16.

25. A cathode electrode comprising the electrode material according to claim 17.

* * * * *